April 18, 1939.  W. E. JOHNSON  2,155,270
SIGHT GLASS
Filed Sept. 10, 1937
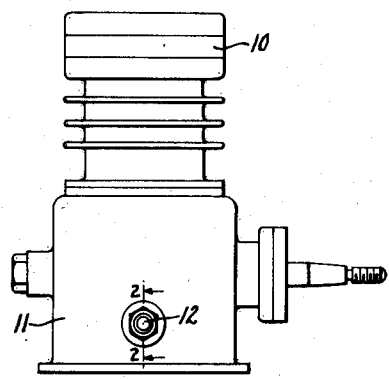
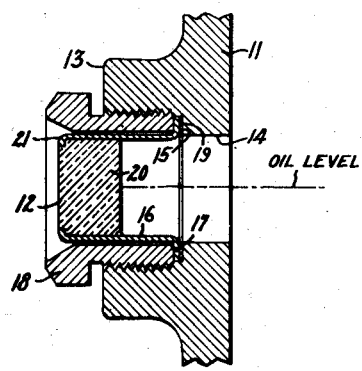
Inventor:
Wilfrid E. Johnson,
by Harry E. Dunham
His Attorney.

Patented Apr. 18, 1939

2,155,270

UNITED STATES PATENT OFFICE 2,155,270

SIGHT GLASS

Wilfrid E. Johnson, Fort Wayne, Ind., assignor to General Electric Company, a corporation of New York Application September 10, 1937, Serial No. 163,277

3 Claims. (Cl. 73—331)

My invention relates to sight glasses for the casings of refrigerant compressors, or the like.

The casings of refrigerant compressors are frequently provided with sight glasses in order to allow the operator to observe the moving parts of the compressors housed in the casings and the lubricant levels within the compressor casings. In the type of sight glass usually employed, a glass window is disposed adjacent an observation opening in the compressor casing and an arrangement including a packing gland and a follower nut in threaded engagement with the casing is provided for retaining the glass window in place, the packing gland being interposed between the glass window and the follower nut. In practice this type of sight glass has not been satisfactory due to the fact that it is subject to leaks caused by the deteriorating effect of the lubricant and the refrigerant contained in the compressor casing upon the packing gland. Moreover, as the compressor casing is subjected to considerable pressure variation during the various operating cycles of the refrigerating machine, the follower nut must exert a considerable force upon the glass window through the packing gland in order to seal the opening in the compressor casing which often causes the glass window to fracture.

It is an object of my invention to provide an improved sight glass for a compressor casing, or the like, which positively seals the casing against leaks and which comprises a minimum number of parts.

Another object of my invention is to provide a sight glass having a glass window which is free of all strains tending to fracture the same.

Further objects and advantages of my invention will become apparent as the following description proceeds and the features of novelty which characterize my invention will be pointed out in particular in the claims appended to and forming part of this specification.

For a better understanding of my invention reference may be had to the accompanying drawing in which Fig. 1 is a side elevational view of a refrigerant compressor having a casing provided with a sight glass embodying my invention; and Fig. 2 is an enlarged sectional view of the sight glass along the line 2—2 of Fig. 1.

Referring to the drawing, in Fig. 1 I have shown a refregrant compressor 10 having a casing 11 provided with a sight glass 12. As best shown in Fig. 2 the casing 11 is provided with a boss 13 having an observation opening 14 therein adjacent the normal lubricant or oil level in the casing, which allows the operator to observe the moving parts of the compressor housed in the casing and to observe the height of the oil level therein. The opening 14 may also be utilized in charging oil into and draining oil from the casing 11. The boss 13 also has a counterbore therein which provides a shoulder 15 in the opening 14.

The sight glass 12 comprises a tubular member 16 having a flanged inner end 17 which is arranged in the counterbore in the boss 13. The opening in the tubular member 16 is arranged in alignment with and presented to the opening 14. The flanged inner end 17 of the member 16 is tightly secured to the shoulder 15 about the opening 14 by an arrangement including a tubular follower nut or ring 18 having a hexagonal head. Preferably, a gasket 19 comprising a copper ring covered with lead is interposed between the shoulder 15 and the flanged inner end 17 of the member 16 in order to form a fluid-tight joint therebetween. The inner end of the follower nut 18 directly engages the flanged inner end 17 of the member 16 and the outer surface of the follower nut 18 is provided with threads which engage corresponding threads provided in the side wall of the counterbore in the boss 13. A transparent glass window 20 is disposed within the tubular member 16 and extends across the outer end thereof, the marginal edge of the window 20 being fused to the adjacent portion of the tubular member 16 in order to provide a fluid tight seal therebetween. Preferably the extreme outer end of the member 16 is turned inwardly adjacent the outer surface of the glass window 20 as indicatefd at 21 in order to protect the window 20 against injury incident to replacement and removal. Also the outer end of the follower nut 18 projects somewhat beyond the outer surface of the window 20 in order to prevent other objects from striking the window 20 and fracturing the same.

It will be observed that the follower nut 18 has an internal diameter substantially greater than the external diameter of the member 16. In other words the follower nut 18 surrounds the member 16 in spaced relation thereto so that the window 20 is not strained by the follower nut 18 regardless of the extent to which the follower nut is tightened against the flanged inner end 17 of the member 16. Thus, the seal between the metal member 16 and the glass window 20 is free of strains produced by external forces. In order to provide a seal between the metal member 16 and the glass window 20 which is entirely free of all strains, internal strains in the seal must also be eliminated. In order to eliminate internal strains in the seal between the metal member 16 and the glass window 20, these parts are formed of materials having thermal expansion characteristics which closely match one another throughout the temperature range between 0° C. and the softening temperature of the glass of the window. This result may be accomplished by forming the member 16 of material comprising an alloy essentially of iron, nickel and cobalt and by forming the window 20 of a material comprising boro-silicate glass, as described in Burger et al. Patent No. 2,071,196, granted February 16, 1937, and assigned to the General Electric Company, assignee of my present invention.

For example, a glass having the approximate composition of 65% silica ($SiO_2$), 23% boric oxide ($B_2O_3$), 7% sodium oxide ($Na_2O$), and 5% aluminum oxide ($Al_2O_3$) may be fused to an alloy having the approximate composition of 18% cobalt (Co), 28% nickel (Ni), and 54% iron (Fe) in order to provide a seal therebetween which is free of internal strains. Other examples of suitable glasses and alloys which may be utilized to provide seals free of internal strains are described in the above mentioned Burger et al. Patent #2,071,196.

In a seal of this character the glass window 20 does not tend to pull away from the metal member 16 upon cooling after it has been fused thereto. Moreover, the metal member 16 does not tend to crush the glass window 20 upon cooling after the fused seal therebetween has been made. Consequently no internal strains are set up in the seal between the window and the member and a strained-free seal therebetween is provided.

From the foregoing description of the sight glass 12 it will be apparent that the moving parts of the compressor housed within the compressor casing 11 as well as the oil level in the compressor casing may be readily observed through the window 20 from the exterior of the casing. Also it will be apparent that the sight glass may be readily placed and removed in a simple manner merely by manipulating the follower nut 18. In view of the fact that the flanged inner end 17 of the tubular member 16 is tightly secured to the shoulder 15 and the window 20 is fused to the member 16, the observation opening 14 in the casing 11 is sealed against leakage of air thereinto and leakage of refrigerant and lubricant therefrom. Moreover, as the glass window 20 of the sight glass is free of all strains tending to cause fracture of the same, breakage is reduced to a minimum.

While I have shown a particular embodiment of my invention in connection with the casing of a refrigerant compressor, I do not desire my invention to be limited to the particular construction shown and described, and I intend in the appended claims to cover all modifications within the scope and spirit of my invention.

What I claim as new and desire to obtain by Letters Patent of the United States is:

1. A casing having an observation opening therein and a counterbore about one end of said opening, a tubular metal member having a flanged end arranged in said counterbore, means including a follower surrounding said member for tightly securing the flanged end of said member to said casing, and a glass window disposed within said member and sealed thereto.

2. A casing having an observation opening therein, a metal member having a glass window disposed therein and sealed thereto, said member also having an outwardly extending flanged end, and means for clamping said flanged end about said opening and against said casing, said means including a follower ring having an internal diameter substantially greater than the external diameter of said member, whereby strains resulting from clamping said member to said casing are substantially prevented from affecting said window or said seal.

3. A casing having an observation opening therein and a counterbore about one end of said opening, a tubular member having a glass window sealed therein and a flanged end disposed within said counterbore, and a tubular follower surrounding said member in spaced relation thereto and adapted to clamp said flanged end against said casing whereby adverse strains on said window are avoided.

WILFRID E. JOHNSON.